Feb. 11, 1930.  B. M. SHIPLEY  1,746,910
CASH REGISTER
Filed March 28, 1927   8 Sheets-Sheet 1

FIG. 1

Inventor
Bernis M. Shipley
By Carl Beust
Henry E Stauffer
His Attorneys

Feb. 11, 1930.　　　　B. M. SHIPLEY　　　　1,746,910
CASH REGISTER
Filed March 28, 1927　　8 Sheets-Sheet 3

Inventor
Bernis M. Shipley
By
His Attorneys

Feb. 11, 1930. B. M. SHIPLEY 1,746,910
CASH REGISTER
Filed March 28, 1927    8 Sheets-Sheet 4

Inventor
Bernis M. Shipley
By Carl Beust
Henry C. Stauffer
His Attorneys

Feb. 11, 1930.     B. M. SHIPLEY     1,746,910
CASH REGISTER
Filed March 28, 1927    8 Sheets-Sheet 5

FIG. 6

Feb. 11, 1930. B. M. SHIPLEY 1,746,910
CASH REGISTER
Filed March 28, 1927   8 Sheets-Sheet 6

Inventor
Bernis M. Shipley
By Carl Beust
Henry E. Stauffer
His Attorneys

Feb. 11, 1930.   B. M. SHIPLEY   1,746,910
CASH REGISTER
Filed March 28, 1927   8 Sheets-Sheet 7

Inventor
Bernis M. Shipley
By
His Attorneys

Patented Feb. 11, 1930

1,746,910

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed March 23, 1927. Serial No. 179,003.

This invention relates to improvements in cash registers, and more particularly to the type shown and described in Letters Patent of the United States No. 1,242,170 issued to F. L. Fuller, on October 9, 1917.

One object of this invention is to provide indicator devices by means of which the operator can ascertain the condition of the adding and subtracting totalizer, that is, whether there is an amount on the totalizer or whether the totalizer has been overdrawn.

Another object of this invention is to provide "clear", "plus" and "over" indicating means for an adding and subtracting totalizer of the type shown in the Fuller patent referred to.

With these and incidental objects in view, the invention includes certain novel features and constructions of parts, the essential elements of which are set forth in appended claims and a preferred form or embodiment of which is hereinafter described with reference to the drawings which accompany and form part of this specification.

General description

In machines of the type shown and described herein, the adding and subtracting totalizer does not have readable characters thereon, and for this reason, it is impossible for the operator to ascertain whether or not the adding and subtracting totalizer is clear, whether there is an amount standing thereon, or whether the totalizer has been overdrawn without operating the machine. The present invention includes a plurality of indicators automatically adjusted under control of the totalizer so that the operator may at all times determine the condition of the totalizer at a glance. When the totalizer is cleared, an indicator having thereon the word "Clear" appears in a window provided therefor. When a totalizer is engaged with the actuators to have an amount added thereon, the indicator is adjusted so that the word "Plus" appears in this window. If during the operation of the machine the totalizer is overdrawn, a second indicator having thereon the word "Over" is moved into position so that the word "Over" appears through the window. Thus, it is seen that the operator can, at all times, tell what condition the totalizer is in.

Detail description

Figure 6:
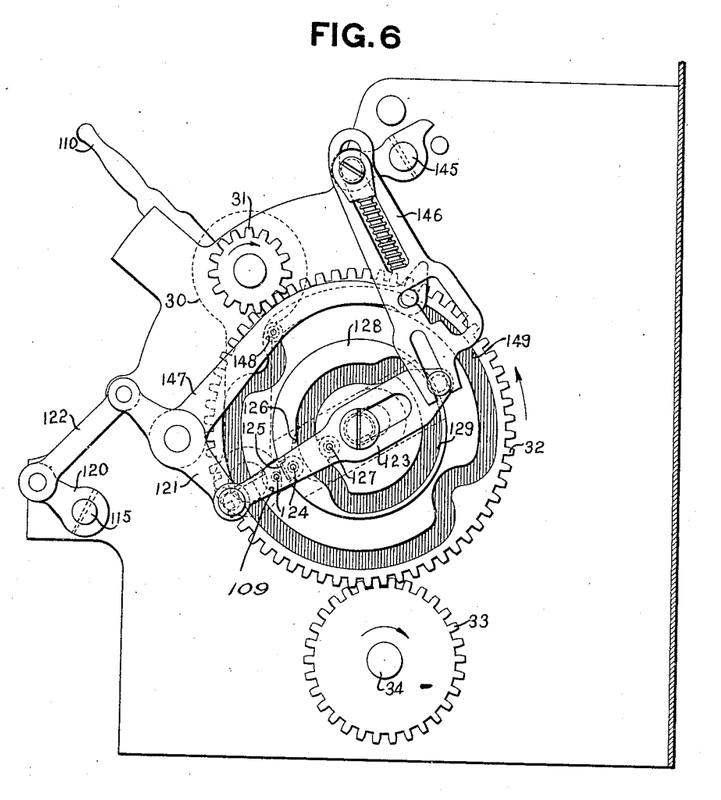
Fig. 6 is a right hand elevation of the machine, and shows the main operating devices therefor.

This machine, like all machines of this type, is adapted to be driven either by an electric motor or by a crank; but inasmuch as this forms no part of the present invention only a crank has been illustrated herein. The crank 30 (Fig. 6) is shown in dotted lines so as not to hide the other mechanism. The crank 30 is operatively connected to a pinion 31 which drives a gear 32 which, in turn, meshes with a gear 33 secured to the main cam shaft 34. The ratio of the gears is such that two rotations of the crank 30 causes one rotation of the shaft 34 in the direction of the arrow.

Keyboard

Figure 1:
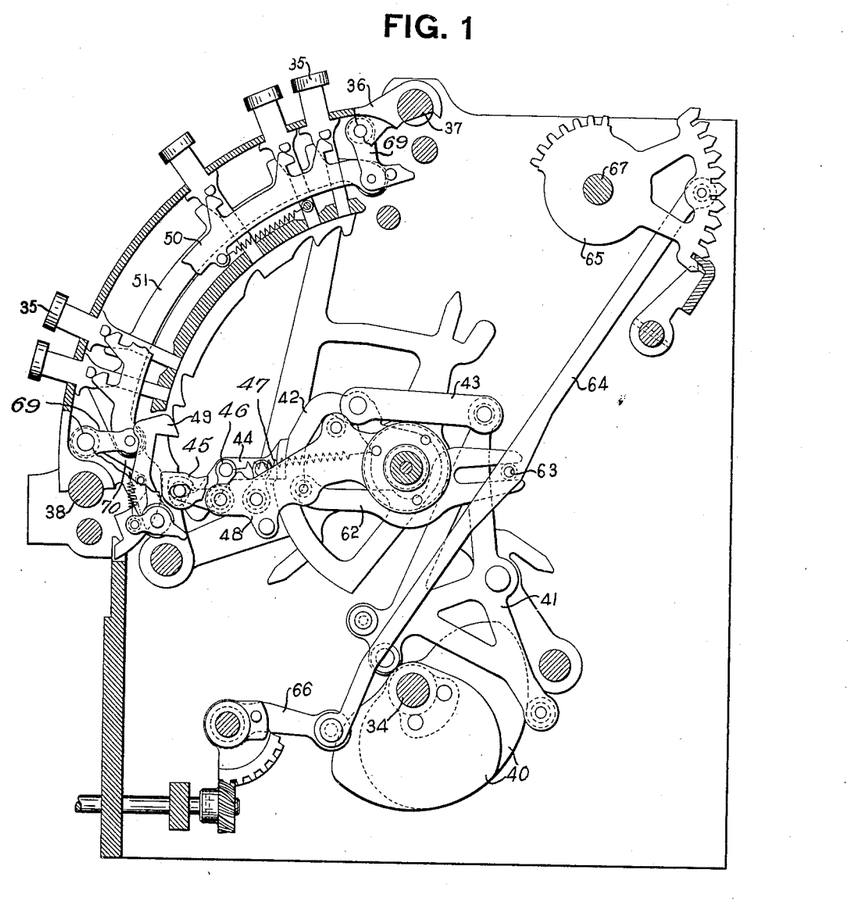
Fig. 1 is a section taken to the right of the transaction bank, and shows the differential mechanism for shifting the adding and subtracting totalizer.
Figure 2:
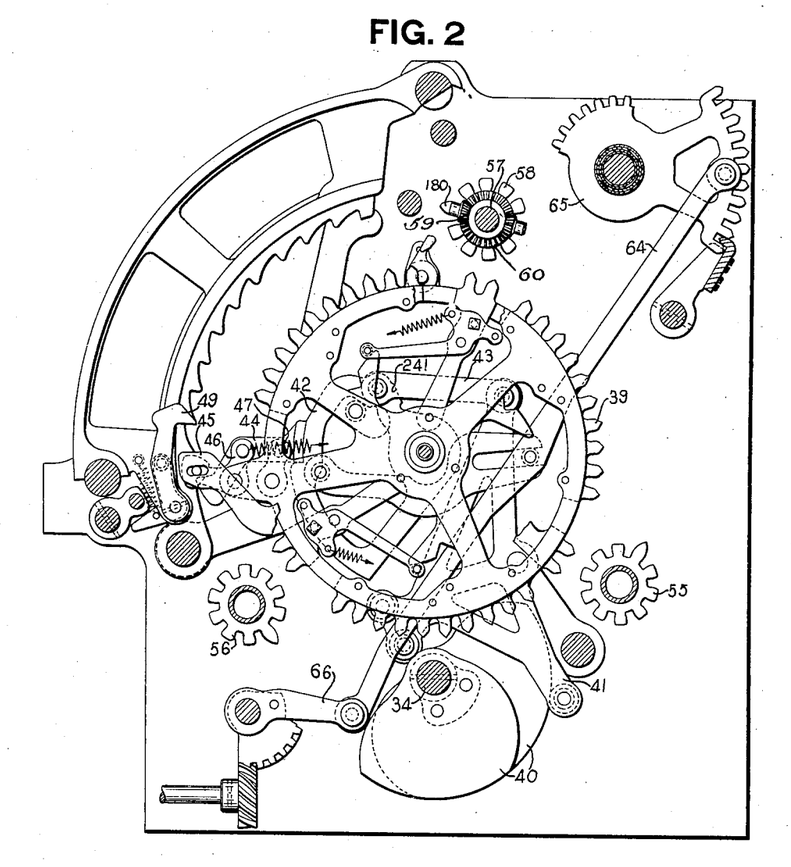
Fig. 2 is a section looking toward the right side of the highest amount differential mechanism.

The machine is provided with a plurality of banks of amount keys (not shown), but they are similar to the transaction keys 35 (Fig. 1). Three banks of transaction keys are provided. However, only one, namely, the first bank, is shown in Fig. 1, inasmuch as this bank is the only one forming a part of the invention illustrated herein. All of the keys are slidably mounted in key frames 36 carried by rods 37 and 38. The amount banks of keys control the differential movement of actuators similar to the actuator 39 (Fig. 2). Cams 40 secured to the main cam shaft 34 are provided for operating a rocker arm 41, connected to a driving segment 42 by a link 43. The actuator 39 is connected to the segment 42 by a latch 44, but is disconnected from the segment 42 when a reset spider arm 45, connected to a bell crank 46 by a pin and slot connection, engages the zero stop pawl 49, or when the bell crank 46 engages the lower end of a depressed key. The latch 44 is carried by the bell crank 46 and a link 47 mounted on the actuator 39.

The transaction bank (Fig. 1) is provided with cams 40, rocker arm 41, segment 42 and a differentially movable arm 48, the latter being driven by the segment 42 and the latch 44 in the same manner as the latches 44 of the amount banks drive the amount actuators 39. The arm 48 is disconnected from the segment 42 in the same manner as above described for the amount bank actuator 39. All of the above mechanism is old and well known and therefore, no further description thereof will be given herein as reference may be had to the above mentioned patent for a detailed description.

The transaction bank is provided with a flexible detent 50 for holding the keys, when depressed in such positions. The detent is carried by arms 69 pivoted to the key frame 36. This bank is also provided with a movable bar 51 supported at its upper end by an arm (not shown) and at its lower end by an arm 70, both of which are pivoted to the key frame, the lower arm 70 co-operates with the zero stop pawl 49, to rock it to its ineffective position when a key is depressed.

Totalizers

The machine is provided with two lines of totalizers 55 and 56 and a totalizer 57 (Fig. 2). However, no further reference will be made to the totalizer lines 55 and 56 because they form no part of the present invention. The totalizer 57 which is the adding and subtracting totalizer, is the one which controls the special indicators.

The totalizer 57 is provided with a plurality of positive wheels 58 and a plurality of negative wheels 54 (Fig. 3), connected together by a set of beveled pinions 59 and 60 in the usual and well known manner. Before the totalizer is engaged with the actuators 39, it is shifted laterally by a cam 61 (Fig. 3) adjusted under control of the differentially movable arm 48 of the transaction bank (Fig. 1). Pivoted to the arm 48 is a beam 62 bifurcated to embrace a stud 63 carried by a link 64 connected to a segment 65 at its upper end, and to an arm 66 at its lower end. The arm 66 is connected to a train of mechanism for adjusting type wheels (not shown), for printing characters indicating the types of transactions entered. The segment 65 is secured to a shaft 67, to which is also secured an arm (not shown), but which is connected to a link 68 (Fig. 3) pivoted to the shifting cam 61. Thus, it is seen that the transaction keys 35 (Fig. 1) control the adjustment of the cam 61, thereby shifting the totalizer according to the key depressed. The three upper keys 35 (Fig. 1) cause the totalizer to be shifted so that the positive wheels 58 are alined with the actuators 39, and the two lower keys 35 cause the totalizer to be shifted so that the negative wheels 54 are alined with the actuators.

Figure 3:
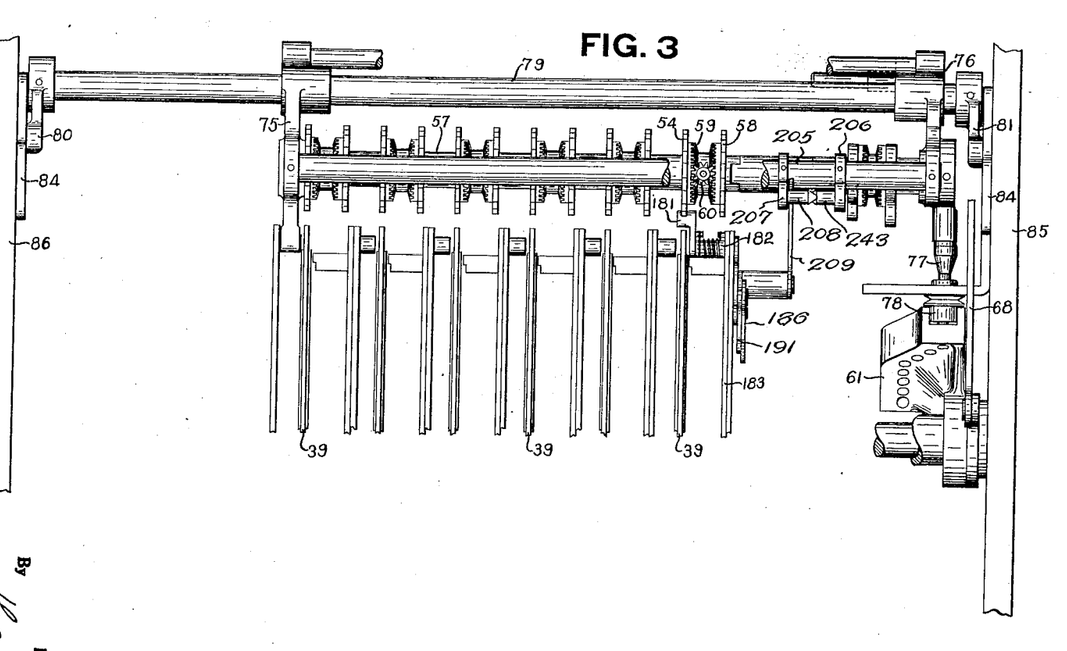
Fig. 3 is a rear view of the adding and subtracting totalizer, together with the amount differential actuators and the cam for shifting the totalizer laterally.

The totalizer is carried by two frames 75 and 76, the latter being provided with a stud 77 on which is mounted a roller 78 which projects into the race of the cam 61. The frames 75 and 76 are slidably mounted on a shaft 79 carried by a pair of arms 80 and 81 (see also Fig. 4). The arms 80 and 81 are each provided with a roller 82 each of which projects into a slot 83 of a cam plate 84. The cam plates 84 are mounted on side frames 85 and 86 of the machine, as shown in Fig. 3. By referring to Fig. 4, it will be seen that the shaft 79 is mounted so that it may be moved radially in slots 87 cut in the plates 84.

*Totalizer engaging mechanism*

The totalizer is engaged with the actuators by the well known mechanism provided in machines of this type, which is shown and described in the above mentioned patent. This mechanism includes a pair of cams 95 mounted on the main cam shaft 34 (Fig. 4), which rock a lever 96 pivoted on a stud 97 carried by the frame work of the machine. The lever 96 has pivoted thereon a pitman 98 supported at its other end by a stud 99 carried by a lever 100 pivoted on a stud 106 carried by the total lever hanger (not shown). The pitman 98 has a notch 101 normally engaging a stud 102 on a totalizer engaging spider 103. This spider is provided with three hooks 104, but the upper hook only need be considered herein. A stud 105 carried by a link 107 is normally in engagement with the hook 104. The upper end of the link 107 is pivoted to the arm 80 on the totalizer supporting shaft 79. When the cam shaft 34 is rotated, the lever 96 and pitman 98 rotate the spider 103 to move the link 107 downwardly, thereby causing the totalizer supporting shaft 79 to be moved radially as guided by the slots 87 in the plates 84. This movement causes the totalizer wheels to be rocked into engagement with the actuators 39.

The totalizer engaging movement just described is for adding operations only. It is necessary to change the timing of the engagement and disengagement of the totalizer and the actuators during read and reset operations. The mechanism for accomplishing this is old and well known and described in detail in the above mentioned patent, and therefore only a very brief description will be given herein.

Figure 4:
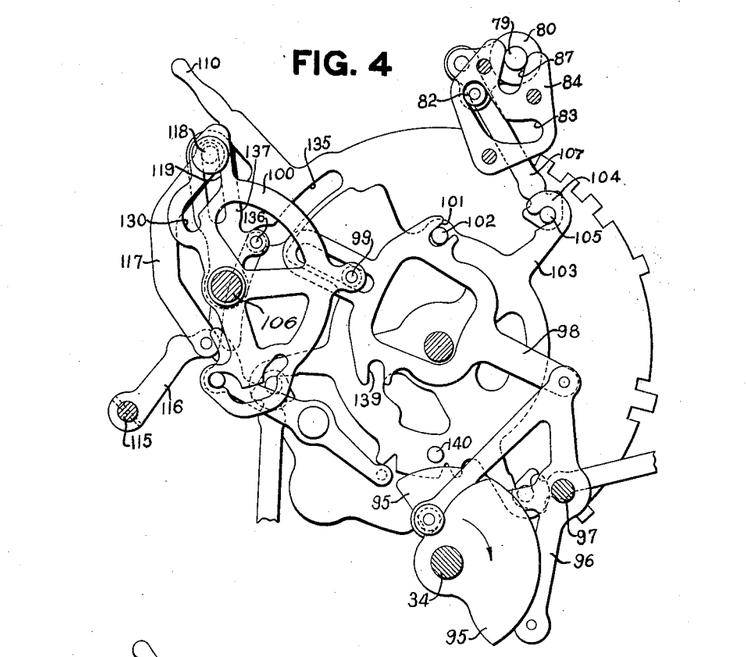
Fig. 4 is a side elevation of the total lever and the mechanism for engaging the totalizers with the actuators and for disengaging them therefrom.
Figure 5:
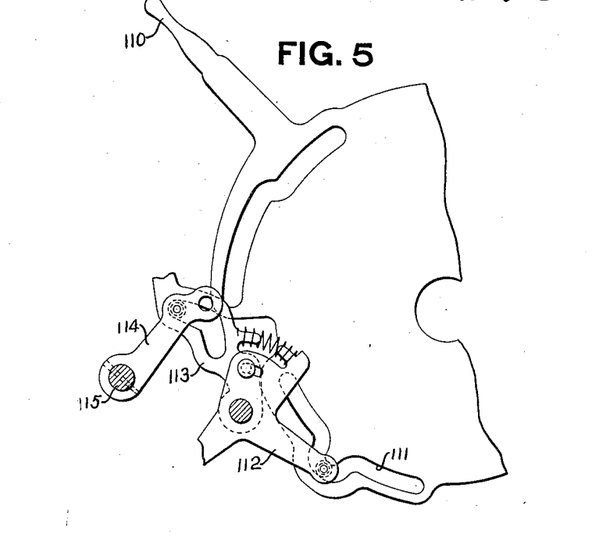
Fig. 5 is a fragmentary detail view of the total lever, and shows a part of the mechanism controlled thereby.

When it is desired to read the totalizer, that is, take a sub-total, the total lever 110 (Fig. 4), is rocked upwardly to the appropriate position. The lever 110 (Fig. 5) is provided with a cam slot 111 adapted to rock a lever 112, flexibly connected to an arm 113 for adjusting an arm 114. The arm 114 is secured to a shaft 115, known as the zero throw out reset shaft, to which is also secured an arm 116 (Fig. 4). When the lever 110 is moved as just described, the arm 116 lowers a link 117 to a position in which a stud 118 carried thereby is lowered in a cam slot 119. The cam slot 119 is cut in the lever 100 and is provided for adjusting the lever 100 for read and reset operations. However, the manual movement of the shaft 115 just described is not great enough to rock the lever 100, therefore, this shaft receives a further movement, by a mechanical means to be later described.

The shaft 115 (Fig. 6) has also secured thereto an arm 120 connected to a lever 121 by a link 122. Connected to the lever 121 is a pitman 123 provided with two studs 124 between which is located a flange 125 of a coupling plate 126. The plate 126 is shown in dotted lines only, as this mechanism is clearly illustrated in the above mentioned patent. Also mounted on the pitman 123 is a roller 127 which normally lies in a notch in a cam disk 128. The cam disk is mounted within a recess in the face of the gear 32, said gear being normally free to move independently of the cam disk 128 during adding operations. When the shaft 115 receives its manual movement, upon movement of the total lever 110, the pitman 123 is moved toward the front of the machine, thereby moving the roller 127 into a cam slot 129 in the cam disk 128. The coupling plate 126, through the studs 124 and flange 125, is moved with the pitman 123 and when thus adjusted, the narrow end of the coupling plate 126 enters a notch 109 in the gear 32 and thus causes the cam disk 128 to be coupled with the gear 32 so that when the gear 32 receives its movement during total taking operations the cam disk 128 is moved therewith.

The cam disk 128, by means of the cam slot 129 causes the shaft 115 to receive an additional movement during total taking operations. This movement of the shaft 115 causes the arm 116 (Fig. 4) to receive an additional movement, thereby lowering the link 117 (Fig. 4), an additional distance so that the stud 118 is moved into the lower end 130 of the cam slot 119, thereby causing the lever 100 to be rocked in a direction to disengage the pitman 98 from the stud 102. This movement of the shaft 115 and pitman 98 takes place after the totalizer has been engaged with the actuators. During total taking operations, the cam shaft 34 receives two complete rotations. During read operations the totalizer engages the actuators during the beginning of the first cycle of operation, and the shaft 115 receives its additional movement during the latter part of this first cycle. Thus, it is apparent that the pitman 98 is disengaged from the stud 102 after the totalizer has been engaged with the actuators. Near the end of the second cycle of the read operation, the shaft 115 is again returned and the pitman 98 is again rocked into engagement with the stud 102, after which the cams 95 cause the pitman 98 to return to its home position to disengage the totalizer from the actuators.

During reset operations, the totalizer is engaged with the actuators later than during read operations, and to control the machine for reset operations the total lever (Figs. 4 and 5) is provided with a cam slot 135 which cooperates with a roller 136 carried by an arm 137 pivoted on the stud 106. Said arm 137 has a straight slot through which the stud 118 projects. When adjusting the machine for reset operations, the total lever is lowered. When the total lever 110 is thus lowered, the cam slot 135 causes the arm 137 to be rocked, and, by means of the stud 118, causes the lever 100 to be rocked immediately, to disconnect the pitman 98 from the stud 102 and thus the pitman 98 is lowered by the manual movement of the total lever. After the pitman has been manually lowered and the machine is operated, the shaft 115 receives its second movement through the cam disk 128, as above described, which movement gives the pitman 98 an additional movement far enough to engage a notch 139 in its lower edge with a stud 140 on the totalizer engaging spider 103. After the pitman 98 is thus engaged with the spider 103, the cams 95 rock the pitman toward the left (Fig. 4) to engage the totalizer with the actuators. The cams 95 return the pitman 98 to its right hand position before the shaft 115 receives its initial return movement. Thus, it is seen that the stud 140 is provided for engaging and disengaging the totalizer during reset operations, whereas the stud 102 is provided for engaging and disengaging the totalizer during adding and read operations.

Figures 16, 17, 18, 19, 20, 21, 22, 23, 24:
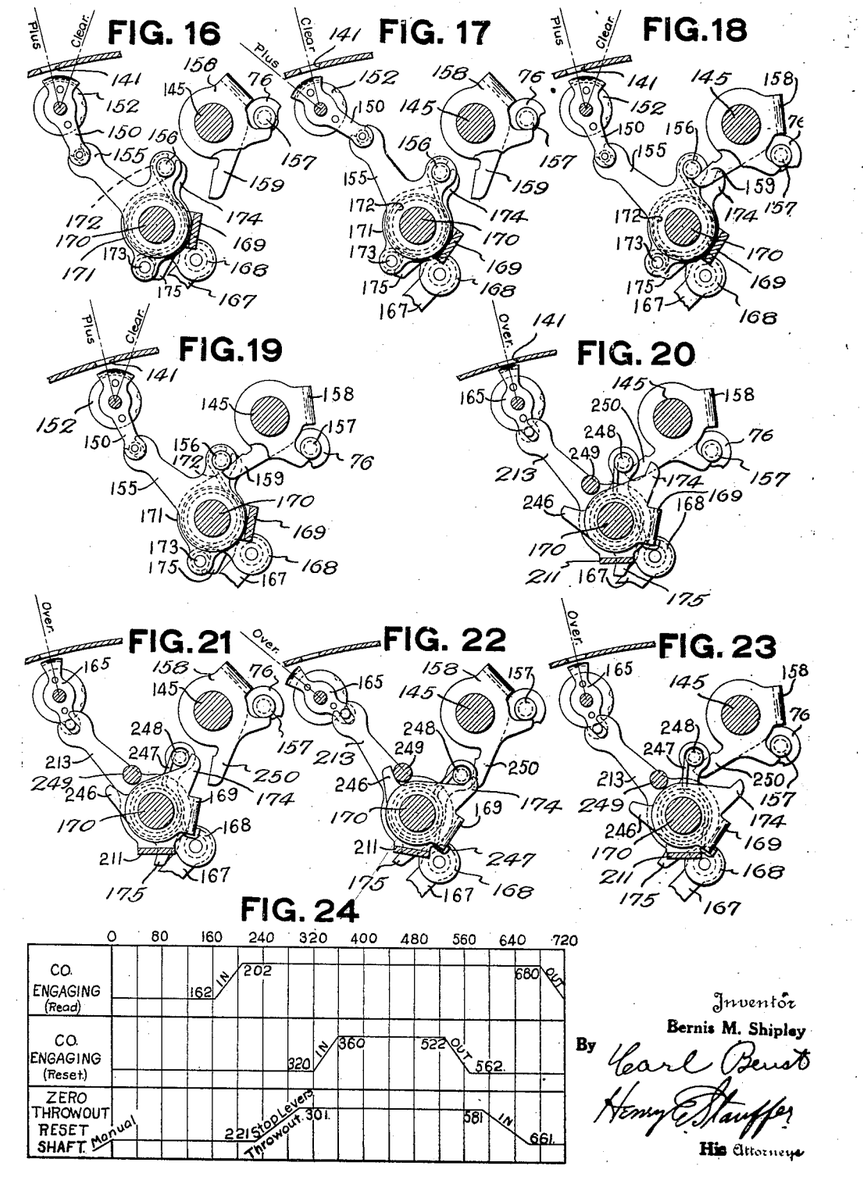
Fig. 16 is a detail view of a part of the clear-plus operating mechanism shown in the position it assumes when the total lever has been manually adjusted.
Fig. 17 is a detail view of the mechanism shown in Fig. 16 but in the position to which it is adjusted by the operation of the machine.
Fig. 18 is a detail view of the mechanism shown in Figs. 16 and 17, and shows the position to which the mechanism is moved when the totalizer has been engaged during reset operations.
Fig. 19 is a detail view of the mechanism shown in Figs. 16, 17 and 18, and shows the position to which the mechanism is moved when the totalizer is engaged with the actuators during read operations.
Fig. 20 is a detail view of part of the operating mechanism for the "over" indicator, and it shows the position to which the mechanism is adjusted when the totalizer is engaged with the actuators during read operations.
Fig. 21 is a detail view of the mechanism shown in Fig. 20 and shows the position to which the mechanism is adjusted by the total lever for read or reset operations.
Fig. 22 is a detail view of the mechanism shown in Figs. 20 and 21, and shows the position to which the mechanism is adjusted by the machine during reset operations.
Fig. 23 is a detail view of the mechanism shown in Figs. 20, 21 and 22 and shows the position to which the mechanism is adjusted when the totalizer is engaged during reset operations.
Fig. 24 is a time chart showing the relative time in which the totalizer is engaged by the actuators during read and reset operations, and also the time when the zero throw-out reset shaft is operated by the total lever and by the machine.

The time during which this engaging and disengaging movement of the totalizer takes place during read and reset operations is shown in the time chart (Fig. 24). This chart also shows the time when the shaft 115 is operated. This timing is very important in the present application because it is utilized for controlling the adjustments of the "over" and "clear-plus" indicators.

Key release mechanism

This machine is provided with the usual releasing mechanism for releasing the amount and transaction keys at the end of the operation. The usual release shaft 145 (Fig. 6) is operated at the beginning of each operation of the machine in a well known manner, and is restored home by a pitman 146 operated by an arm 147 having a stud 148 projecting into a cam slot 149 in the gear 32. This mechanism is old and well known and described in the above mentioned patent, and inasmuch as it forms no part of the present invention no further reference will be made thereto.

Clear-plus indicator, adding operations

Figures 7, 8:
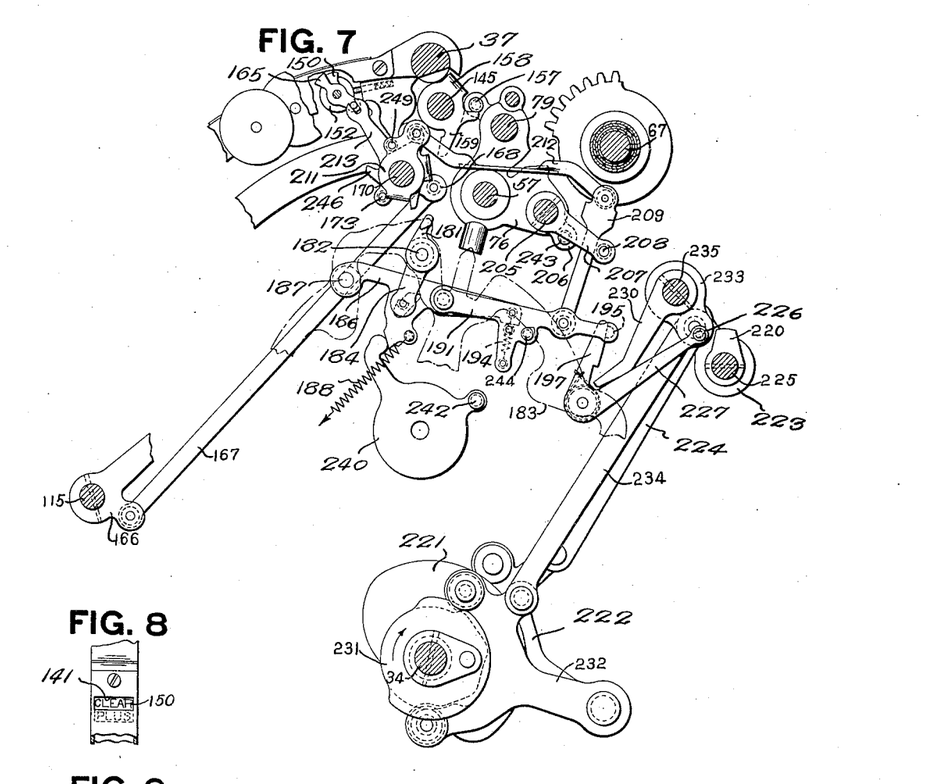
Fig. 7 is a detail view of the operating mechanism for the indicator devices for indicating the condition of the adding and subtracting totalizer.
Fig. 8 is a front elevation of a "clear-plus" indicator.
Figures 14, 15:
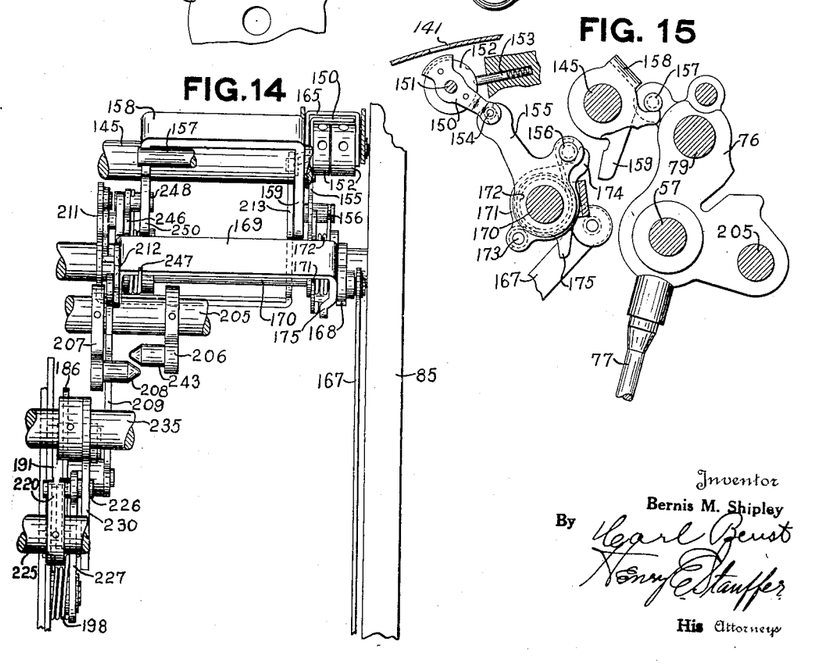
Fig. 14 is a rear elevation of the operating mechanism for both the "over" and the "clear-plus" indicators.
Fig. 15 is a detail view showing the operating mechanism for the "clear-plus" indicator.

For the purpose of describing the "clear-plus" indicator, it will be assumed that the indicator is standing with the word "Clear" opposite the window 141 in the machine casing, and that nothing is standing on the totalizer, as shown in Figs. 8 and 15. The "clear-plus" indicator 150 is mounted on a shaft 151 and has secured thereto an alining disk 152 provided with notches with which an alining plunger 153 cooperates to maintain the indicator in its adjusted positions. The indicator 150 is provided with a stud 154 which projects into a bifurcated arm 155 upon which is mounted a stud 156. The totalizer frame 76 has mounted thereon a stud 157 which cooperates with one arm of a yoke 158. The yoke 158 is provided with an arm 159 to engage the stud 156 when the totalizer is rocked into engagement with the actuators. This movement rotates the arm 155 and the indicator 150 until the word "Plus" appears in the window 141.

Figures 9, 10:
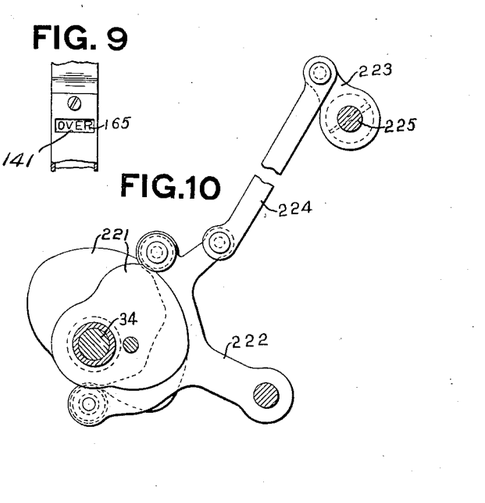
Fig. 9 is a front elevation of the "over" indicator.
Fig. 10 is a detail view of a part of the mechanism shown in Fig. 7.

The mechanism just described is provided for adjusting the indicator during adding operations so that if the indicator is standing at "clear," and the totalizer is engaged with the actuators for adding operations, the indicator is adjusted so that the word "Plus" appears at the window 141. If, during the operation of the machine, the totalizer is overdrawn, the "over" indicator 165 (Figs. 9 and 11), is adjusted by mechanism to be hereinafter described, so that this indicator moves in between the "clear-plus" indicator and the window 141, and the word "Plus" will no longer be visible, but instead thereof the word "Over" will appear.

"Clear-plus" indicator, reset operations

During reset operations, the "clear-plus" indicator is automatically moved to the "clear" position because at the end of a reset operation the totalizer is standing with nothing thereon, and therefore, the indicator must be adjusted accordingly. This movement is effected by a mechanism under control of the shaft 115, above described. It will be recalled that when the total lever 110 is manually adjusted to the reset position, the shaft 115 is given a clockwise movement. The shaft 115 has secured thereon an arm 166 (Fig. 7) to which is pivoted a link 167, the upper end of which is pivoted to an arm 168 (Figs. 11, 12, 13 and 14). The arm 168 is secured to a yoke 169 loosely mounted on a shaft 170 upon which the arm 155 is supported. The arm 155 has flexibly connected thereto by means of a torsion spring 172 an arm 171 (Fig. 15). One end of the coiled spring 172 is attached to a stud 173 on the arm 171, and the other end is attached to the stud 156 on the arm 155. The spring 172 normally holds an ear 174 of the arm 171 in engagement with the stud 156. The stud 156 is a double-ended stud, and projects from both sides of the arm 155, as shown in Fig. 14. When the indicator is moved to the "plus" position, as described during adding operations, the arm 171 is moved therewith, due to the spring 172. When the shaft 115 is manually adjusted by the movement of the total lever 110, the link 167 rocks the arm 168 and yoke 169 clockwise until an ear 175 engages the stud 173. However, it must be borne in mind that when the indicator 150 is adjusted to the "plus" position the stud 173 is rocked in a counter-clockwise direction. The position which the parts assume when the total lever has been adjusted, and the shaft 115 given its initial movement, is shown in Fig. 16. This figure shows that the ear 175 is in engagement with the stud 173. By referring to the time chart (Fig. 24) it will be seen that this manual movement of the shaft 115 takes place before the machine starts to operate, and therefore when the machine is adjusted for reset operations the ear 175 is in engagement with the stud 173 before the machine starts to move. Fig. 24 also shows that the shaft 115 receives its additional movement before the totalizer is engaged with its actuators during reset operations. Therefore, when the shaft 115 is operated by the cam disk 128 the link 167 rotates the arm 171 in a clockwise direction due to the engagement of the ear 175 with the stud 173. Since the arm 155 is connected to the arm 171 by a spring 172, the arm 155 is moved by the link 167, causing the indicator 150 to be returned, to position the word "Clear" in the window 141. When the totalizer is thereafter engaged with its actuators, the arm 159 (Fig. 18) is rocked forward to engage the stud 156 just as in adding operations, thereby moving the indicator 150 to position the word "Plus" in the window 141. However, this movement of the indicator is an idle one, because just as soon as the totalizer is disengaged from the actuator, the spring 172 moves the indicator 150 to position the word "Clear" in the window 141. During this idle movement of the arm 155 and indicator 150, the arm 171 is held in its adjusted position by the ear 175 as shown in Fig. 18.

By referring to Fig. 24, it will be seen that during reset operations the totalizer is disengaged from its actuators before the shaft 115 receives its return movement, and therefore, when the totalizer becomes disengaged the arm 159 of the yoke 158 moves away from the stud 156, thus permitting the arm 155 and indicator 150 to return to the position in which the word "Clear" again appears in the window 141. After the totalizer has been disengaged, the parts again assume the position as shown in Fig. 17, which shows that the "clear" indicator is in the window. After the totalizer has become disengaged, the shaft 115 is again restored to the position to which it was adjusted by the total lever, and the ear 175 is again moved away from the stud 173.

Clear-plus indicator, read operation

It is sometimes desirable to print the amount standing on the totalizer and return such amount into the totalizer, so that other amounts may be subsequently added thereto or subtracted therefrom. During such operation, known as a "read" operation, it is necessary to provide a means for preventing the restoration of the "clear-plus" indicator to its "clear" position. By referring to Fig. 24, it will be seen that the totalizer engages the actuators sooner during read operations than during reset operations, and also before the reset shaft 115 is given its mechanical movement. This difference in timing of the mechanism is utilized to prevent the restoration of the "clear-plus" indicator.

During read operations, the total lever 110 is shifted upward, instead of downward. The cam slot 111 is formed to shift the shaft 115 for "read" operations in the same manner as for reset operations, and therefore, the ear 175 is rocked into engagement with the stud 173 by the lever 110 in the same manner as described for reset operations. However, the totalizer is engaged with the actuators before the ear 175 is moved by the link 167, and therefore, the arm 159 on the yoke 158 is rocked into engagement with the stud 156 before the arm 171 is rocked. Thus, it is seen that during read operations the ear 159 maintains the indicator 150 in its adjusted position, because the arm 171 cannot move the arm 155. After the ear 159 has engaged the stud 156, the link 167 is moved downwardly, and the coil spring 172 is tensioned, but the movement is idle, because the arm 155 cannot operate. When the shaft 115 receives its return movement, the ear 175 is returned to its original position. This movement takes place before the ear 159 becomes disengaged from the stud 156. After the ear 175 has returned to its original position, the totalizer is disengaged, and therefore, the ear 159 moves away from the stud 156 thus permitting the indicator to remain in the "plus" position.

*"Over" indicator, subtracting operation*

An indicator, having engraved thereon the word "Over," is moved into position to hide the "clear-plus" indicator when the totalizer is overdrawn. This indicator is controlled from the highest order totalizer element. The highest order differential mechanism is provided with a device which is similar to the usual and well known transfer mechanism used in machines of this type.

The highest order negative totalizer wheel 54 (Fig. 11), is provided with the usual long tooth 180 which moves in the plane of a trip arm 181 when the totalizer is engaged with the actuators. The arm 181 is secured to one end of a rod 182 having a bearing in the hanger 183 (see also Fig. 3). Secured to the other end of the rod 182 is an arm 184. The arm 184 is provided with a flattened stud 185 which projects into a slot in an arm 186 pivoted on a stud 187 carried by the hanger 183. The arm 186 is provided with a spring 188 which normally tends to rock the arm 186 clockwise but is prevented from doing so by a shoulder 189 which engages the flattened side of the stud 185. When the positive wheel 58 (Fig. 3) moves from zero to nine, the long tooth 180 on the negative wheel 54 engages the arm 181 to disengage the stud 185 from the shoulder 189 and release the arm 186 to permit the spring 188 to rock it clockwise until the upper edge 190 of the slot in the arm 186 engages the stud 185. The arm 186 has flexibly connected thereto an arm 191 for reasons to be hereinafter described. The arm 191 is pivoted on the arm 186 and is provided with a stud 192 held in engagement with the rear end 193 of the arm 186 by a spring 194. When the arm 186 is released as just described, the arm 191 is permitted to rock far enough to permit a stud 195 carried thereby to be latched behind a shoulder 196 of a spring-pressed latch 197. A spring 198 normally tends to rock the latch 197 clockwise but is normally prevented from doing so by the engagement of the latch with the flattened side of the stud 195.

The totalizer frames 75 and 76 have mounted therein a shaft 205 (Figs. 3 and 11) upon which are mounted arms 206 and 207. The arm 207 is provided with a stud 208 adapted to be shifted into the plane of a link 209 when the totalizer is moved to the subtract position. The link 209 is pivotally connected to the arm 191, and therefore when the arm 191 is rocked with the arm 186, the link 209 is lowered. At this time the stud 208 is also lowered due to the fact that the totalizer is in its engaged position.

Figures 11, 12, 13:
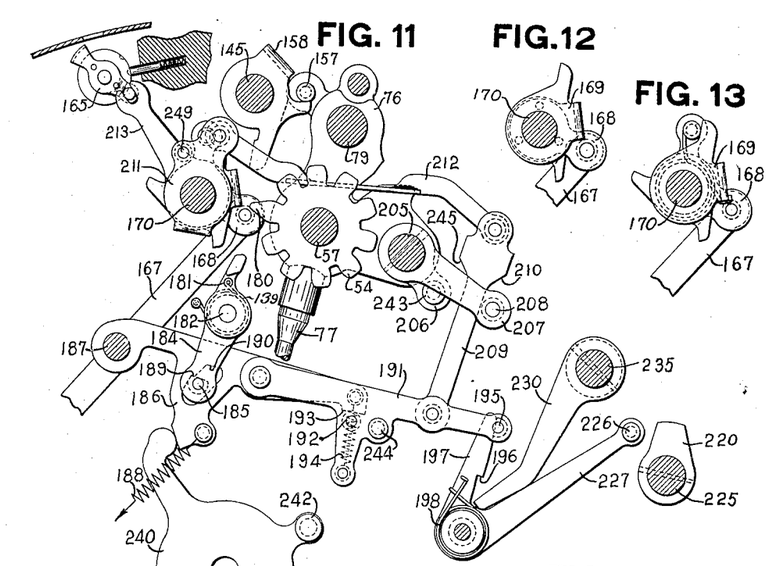
Fig. 11 is an enlarged detail view of the "over" indicator and its associated mechanism.
Fig. 12 is a detail view of a part of the indicator operating mechanism.
Fig. 13 is a detail view of a part of the operating mechanism for the "over" indicator.

The disengaging movement of the totalizer is utilized for shifting the "over" indicator 165 to the position in which the word "Over" is visible through the window 141. During this disengaging movement, after the stud 195 is latched behind the shoulder 196, the stud 208 engages a cam edge 210, thereby causing the link 209 to be rocked to the left (Fig. 11). The link 209 is connected to a yoke 211 by a link 212. The yoke 211 is provided with an upwardly extending bifurcated arm 213 which engages a stud on the indicator 165. Thus, it is seen that when the totalizer is disengaged, the stud 208 cams the link 209, and by means of the link 212, rocks the yoke 211 and arm 213 in a counter-clockwise direction, thereby shifting the indicator 165 so that it is visible through the window 141, and in a position to hide the "clear-plus" indicator.

Once during each operation of the machine, a cam arm 220 (Figs. 7 and 11) is rocked by a pair of cams 221 (Fig. 10) to release the stud 195 from the latch 197. The cams 221 are secured to the main cam shaft 34 and rock an arm 222 once during each operation of the machine. The arm 222 is connected to an arm 223 by a link 224. The arm 223 is secured to a shaft 225 upon which is also secured the arm 220. From this it is seen that once during each operation of the machine the cam arm 220 is rocked back and forth. During this rocking movement the cam arm engages a stud 226 on a rearwardly extending arm 227 of the spring actuated latch 197 and rocks the arm 227 and latch 197 to release the latch 196 from the stud 195.

Simultaneously with the movement of the arm 220, an arm 230 (Fig. 7) is rocked to restore the arms 186 and 191 by the engagement of the arm 230 with the stud 195. The arm 230 is operated by a pair of cams 231 secured to the main cam shaft 34. The cams 231 rock an arm 232 once during each operation of the machine, and when doing so, operate an arm 233 to which it is connected by a link 234. The arm 233 is secured to a shaft 235 (see also Fig. 11), to which is also secured the arm 230. When the main cam shaft 34 is rotated, the arm 230 is rocked clockwise, thereby raising the arm 191, and by means of the stud 192 carries the arm 186 therewith.

The movement given the arms 186 and 191 by the arm 230 is not sufficient to cause the stud 185 to be latched behind the shoulder 189 and, due to the structural relation of the parts in the present machine, it is not possible to permit the arm 191 to be raised high enough to cause this latching. This is due to the fact that the shaft 67 (Fig. 7) and the hub of a segment, for purposes not described herein, lie in the path of the link 209, and therefore limit the amount of movement which may be given thereto. In order to latch the arm 186 behind the stud 185, the usual transfer restoring arm 240 (Fig. 11) is provided which is operated in a well known manner by the engagement of a flattened surface 241 (Fig. 2) on the driving segment 42 with a stud 242 (Fig. 11) on the restoring arm 240. The arm 240 causes a considerable overthrow of the arm 186 for causing the stud 185 to be cammed behind the shoulder 189, in the event that the spring 139 on the arm 184 does not function properly.

The arm 240 operates too late to raise the link 210 out of the path of the studs 208 and 243, because the arm 240 is operated by the driving segment 42, which is timed to operate after the totalizer is shifted to its new position. It will be remembered that when the totalizer is disengaged, the link 209 is shifted toward the left and into the path of a stud 243 carried by the arm 206. For this reason the arm 230 is provided for lifting the link 209 far enough to clear the stud 243, and thereafter the arm 240 operates to cause restoration of the arm 186.

When the arm 240 rocks the arm 186, the arm 191 is held against movement by a stud 244 which strikes the hanger 183 (Fig. 7) to cause the spring 194 to be stretched. However, when the arm 240 is permitted to return home, the spring 188 causes the arm 186 to be lowered to again engage the stud 192, as shown in Fig. 11.

"*Over*" *indicator, adding operations*

If after the totalizer has been overdrawn, and the indicator 165 shifted as just described, an amount is added into the totalizer which causes the totalizer to be restored with an amount on the positive side, the indicator 165 is again shifted to a position in which it is not visible.

The positive wheel 58 is also provided with a long tooth 180 (Fig. 2), and when said positive wheel is in engagement with the actuators 39, its long tooth trips the arm 181 when an amount is added back on the totalizer, and the link 209 (Fig. 11), is lowered just as described for an overdraft operation. However, during this latter operation the stud 208 is not in the path of the link 209, but the stud 243 will have been shifted into the path thereof. During the disengaging movement of the totalizer, after the arms 186 and 191 have been tripped by the long tooth 180 of the positive wheel, the stud 243 engages a cam edge 245 which rocks the link 209 toward the right and back to the position shown. This movement of the link 209, by means of the link 212 and yoke 211, restores the indicator 165 to the position shown in Fig. 11.

"*Over*" *indicator, reset operation*

A mechanism is provided for restoring the "over" indicator 165 to its normal position during reset operations, after the totalizer has been overdrawn. The mechanism for accomplishing this is somewhat similar to the mechanism described for the "clear-plus" indicator.

It will be remembered that the total lever 110 is shifted to reset position before the machine is operated, and in doing so the link 167 (Fig. 21) is lowered. The position to which the restoring mechanism is shifted when the total lever is moved to the reset position is shown in Fig. 21. It will be remembered that the link 167 is connected to the yoke 169 by the arm 168. Flexibly connected to the yoke 169 by a spring 247 is an arm 246. One end of the spring is attached to a stud 248, and the other end is attached to the yoke 169. The yoke 211 (Figs. 11 and 22) has secured thereto a stud 249 which lies in the path of the arm 246. When the link 167 is lowered during a reset operation by the rocking of the shaft 115 as above described, the arm 246 engages the stud 249, thereby causing the yoke 211 to be rocked in a clockwise direction to restore the indicator 165, as shown in Fig. 22.

The stud 248 is a double-ended stud and projects from both sides of the arm 246, as shown in Fig. 14. One end of the stud 248 projects into the path of an arm 250 on the yoke 158. When the totalizer is engaged during reset operations, the arm 250 engages the stud 248, thereby causing the "over" indicator to be again moved to the position in the window. However, this movement is an idle one, because when the totalizer is disengaged, the arm 250 is disengaged from the stud 248 and the spring 247 restores the arm 246 to the position shown in Fig. 22.

"*Over*" *indicator, read operation*

When the totalizer is read and not reset, it is desirable to prevent the restoration of the indicator 165. It will be remembered that the timing of the engagement of the totalizer during read and reset operations is different, as shown in the time chart (Fig. 24). During read operations, the yoke 158 is rocked by the engagement of the totalizer before the link 167 restores the indicator 165. Thus, when the totalizer is engaged with the actuators, the arm 250 is rocked into engagement with the stud 248, as shown in Fig. 20. When the link 167 is lowered, the arm 246 cannot follow the yoke 169, and therefore, the indicator 165 is not restored. During read operations, the totalizer is disengaged after the link 167 has been restored. Thus, it is apparent that the setting of the indicator 165 is not disturbed during read operations.

*Operation*

A short description of the operation of the indicators will now be given. The clear-plus indicator 150 is normally standing with the word "Clear" appearing at the window 141. When the totalizer engages its actuators for adding operations, a connection between the totalizer and the indicator causes the indicator to be moved to shift the word "Plus" into position in the window. During reset operations, the total taking mechanism sets mechanism in operation for causing the indicator to be adjusted so that the word "Clear" again appears in the window 141. This mechanism is also under control of the engaging and disengaging movement of the totalizer. During read operations, the setting of the indicator is not disturbed, because the engagement of the totalizer causes an arm to be rocked into the path of the restoring mechanism and thereby prevents it from being restored to "clear." The indicator 165 for indicating when the totalizer has been overdrawn is operated by a special device controlled by a mechanism tripped by the highest order totalizer negative element when the totalizer is overdrawn. This device is shifted by the disengaging movement of the totalizer, and moves the indicator 165 so that the word "Over" appears at the window, and in such a position that it hides the setting of the clear-plus indicator. If an amount is added back onto the totalizer, the same device is tripped, and when the totalizer is disengaged the mechanism is again shifted to cause the "over" indicator to be moved away from the window. During reset operations, a mechanism operated by the engaging and disengaging of the totalizer, controlled from the total lever, the indicator moves to a position in which it is no longer visible in the window and the clear-plus indicator is again visible. During read operations, a device operated by the totalizer frame prevents the "over" indicator from being restored, and therefore at the end of the operation, the indicator remains in the position in which it was standing at the beginning of the read operation.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a machine of the class described, the combination of an adding an subtracting totalizer, actuators therefor, an adjustable indicator for indicating when the totalizer is clear or plus, means operated while the totalizer is being engaged with the actuators, for operating said indicator, another adjustable indicator for indicating when the totalizer is overdrawn, means operated by the totalizer when the totalizer is overdrawn, a connection from said last-mentioned means to the last-mentioned indicator, and means on the totalizer co-operating with said last mentioned means when the totalizer is being disengaged, for causing said indicator to be adjusted to a position in which it conceals the first-mentioned indicator.

2. In a machine of the class described, the combination of a totalizer, actuators therefor, means to engage the totalizer with and disengage it from the actuators, a shiftable indicator for indicating when the totalizer is clear, or has an added amount thereon, and a member moved by the totalizer as an incident to the engagement of the totalizer with the actuators during an adding operation, for shifting said indicator to indicate the addition of an amount thereon, said indicator being adapted to remain where adjusted until the totalizer is cleared.

3. In a machine of the class described, the combination of a totalizer, actuators therefor, means to engage the totalizer with and disengage it from the actuators, a shiftable indicator for indicating when the totalizer is "clear" or "plus", means to set the machine for clearing operations, a member moved by the totalizer as an incident to the engagement of the totalizer with the actuators during the first adding operation after the totalizer has been cleared, for shifting said indicator to "plus", and means operable as an incident to clearing operations for shifting said indicator back to "clear."

4. In a machine of the class described, the combination of an adding and subtracting totalizer, actuators therefor, means to engage the totalizer with and disengage it from the actuators, a shiftable indicator for indicating when the totalizer is clear or has an amount added thereon, means to set the machine to perform reading, or clearing operations, a member moved by the totalizer when the totalizer is being engaged with the actuators during the first adding operation after the totalizer has been cleared, for shifting said indicator to indicate the addition of an amount thereon, said member being operable as an incident to the performance of a reading operation for preventing the indicator from shifting back to clear, and means operable as an incident to the performance of a clearing operation for shifting said indicator back to clear.

5. In a machine of the class described, the combination of a totalizer, a shiftable indicator for indicating when the totalizer is clear or plus, a total lever for adjusting the machine for total taking operations, means controlled by said total lever for causing said indicator to be shifted to its clear position during a clearing operation, and a device operated by the totalizer engaging movement for preventing said means from becoming effective during a reading operation.

6. In a machine of the class described, the combination of a totalizer, a shiftable indicator for indicating when the totalizer is clear or plus, a total lever for adjusting the machine for total taking operations, and means including a cam operable during total taking operations for shifting said indicator to its clear position.

7. In a machine of the class described, the combination of a totalizer, a shiftable indicator for indicating when the totalizer is clear or plus, a total lever for adjusting the machine for total taking operations, a cam adapted to be brought into operation by said lever during total taking operations for shifting said indicator to its clear position, a member for preventing said indicator from shifting to its clear position during reading operations, and a flexible connection between said indicator and cam for permitting the cam to move when the indicator is held against movement during reading operations.

8. In a machine of the class described, the combination of an adding and subtracting totalizer, a normally concealed indicator for indicating when the totalizer is overdrawn, means for displaying said indicator, a total lever for adjusting the machine for total taking operations, means controlled by said total lever for causing said indicator to be shifted during clearing operations to a position in which the indicator is no longer visible, and a device for preventing said means from becoming effective during reading operations.

9. In a machine of the class described, the combination of a totalizer, a shiftable indicator for indicating when the totalizer is clear or has a positive amount thereon, a shiftable indicator adapted to conceal said first-mentioned indicator, for indicating when the totalizer is overdrawn irrespective of the position of said first-mentioned indicator, a total lever for adjusting the machine for total taking operations, a cam adapted to be operated under control of said lever for shifting the clear-plus indicator to a position to indicate that the totalizer is clear to position the second-named indicator to a position in which its indication is not visible after a clearing operation, and a member for preventing both of said indicators from shifting during reading operations.

10. In a machine of the class described, the combination of an adding and subtracting totalizer, actuators therefor, means to engage the totalizer with and disengage it from the actuators, a normally concealed indicator for indicating when the totalizer is overdrawn, and means controlled by the totalizer and adapted to be moved thereby as the totalizer is being disengaged from the actuators, for displaying the indicator.

11. In a machine of the class described, the combination with a totalizer; actuators therefor; means to engage the totalizer with and disengage it from the actuators; and a manually operable lever to set the machine for clearing operations; of an adjustable indicator to indicate when the totalizer is clear, and when it registers an amount; means operable when the totalizer is shifting into engagement with its actuators, to adjust the indicator to indicate that an amount is registered on the totalizer; normally ineffective means set to effective position by the manual adjustment of the clearing lever to clearing position; and means operable upon the normally ineffective means when set to effective position, to adjust the indicator to indicate that the totalizer is clear.

12. In a machine of the class described, the combination with a totalizer; actuators therefor; means to engage the totalizer with and disengage it from the actuators; and manually operable means to set the machine for reading and for clearing operations; of an adjustable indicator to indicate when the totalizer is clear, or when it registers an amount; means operable when the totalizer is shifting into engagement with its actuators, to adjust the indicator to indicate that an amount is registered on the totalizer; normally ineffective means set to effective position by the adjustment of the manually operable means to its reading or its clearing position; means operable upon the normally ineffective means when set to effective position, to adjust the indicator to indicate that the totalizer is clear; and means to automatically restore the indicator to indicate the registration of an amount prior to the conclusion of a reading operation.

In testimony whereof I affix my signature.

BERNIS M. SHIPLEY.